(12) United States Patent  (10) Patent No.: US 8,912,131 B2
Gregg  (45) Date of Patent: Dec. 16, 2014

(54) METHOD FOR SEA FLOOR DRILLING USING HAGFISH SLIME AS DRILLING FLUID ADDITIVE

(71) Applicant: Gregg Drilling & Testing, Inc., Signal Hill, CA (US)

(72) Inventor: John Gregg, Signal Hill, CA (US)

(73) Assignee: Gregg Drilling & Testing, Inc., Signal Hill, CA (US)

( * ) Notice: Subject to any disclaimer, the term of this patent is extended or adjusted under 35 U.S.C. 154(b) by 0 days.

(21) Appl. No.: 14/346,726

(22) PCT Filed: Oct. 10, 2012

(86) PCT No.: PCT/US2012/059415
§ 371 (c)(1),
(2), (4) Date: Mar. 26, 2014

(87) PCT Pub. No.: WO2013/059031
PCT Pub. Date: Apr. 25, 2013

(65) Prior Publication Data
US 2014/0228257 A1    Aug. 14, 2014

Related U.S. Application Data

(60) Provisional application No. 61/549,782, filed on Oct. 21, 2011.

(51) Int. Cl.
C09K 8/02    (2006.01)
C09K 8/20    (2006.01)
C09K 8/06    (2006.01)
C09K 8/08    (2006.01)

(52) U.S. Cl.
CPC .... *C09K 8/06* (2013.01); *C09K 8/08* (2013.01)
USPC .......................................... 507/103; 507/104

(58) Field of Classification Search
CPC ............... C09K 8/34; C09K 8/36; C09K 8/32
USPC .................................................. 507/103, 104
See application file for complete search history.

(56) References Cited

U.S. PATENT DOCUMENTS

2009/0036853 A1*  2/2009  Allan ........................... 604/368

* cited by examiner

*Primary Examiner* — Bijan Ahvazi
*Assistant Examiner* — Atnaf Admasu
(74) *Attorney, Agent, or Firm* — Richard A. Fagin; Adenike Adebiyi

(57) ABSTRACT

A method for drilling formations below the bottom of a body of water include mixing a selected amount of hagfish slime with water and drilling the formations using the slime-water mixture as a circulating drilling fluid.

4 Claims, 1 Drawing Sheet

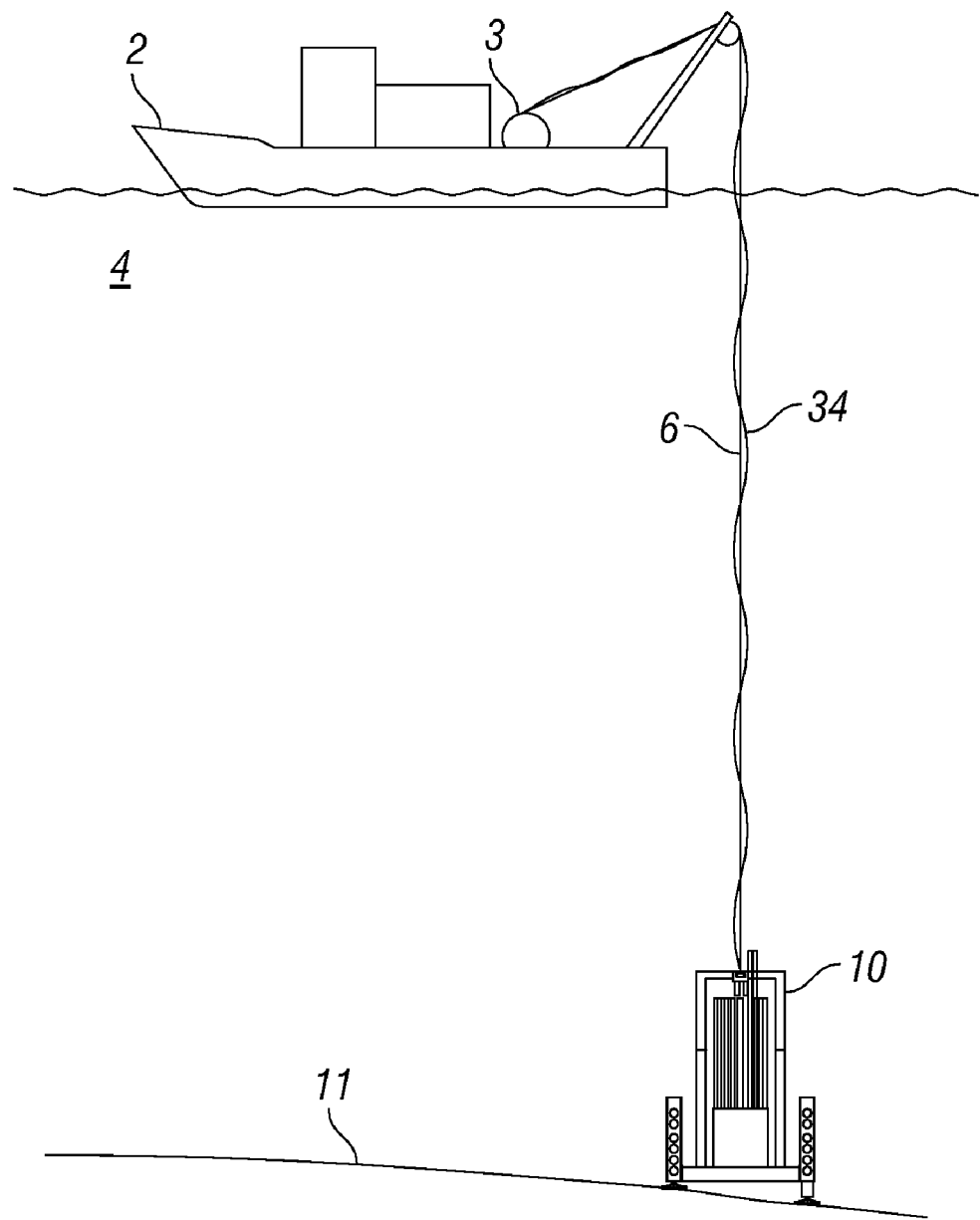

METHOD FOR SEA FLOOR DRILLING USING HAGFISH SLIME AS DRILLING FLUID ADDITIVE

BACKGROUND

U.S. Pat. No. 7,380,614 issued to Williamson et al. describes a method and apparatus for obtaining core samples from formations below the bottom of a body of water. The method includes disposing a drilling system on the bottom of the body of water. The formations are drilled by rotating a first drill rod having a first core barrel latched therein and advancing the drill rod longitudinally. At a selected longitudinal position, an upper end of the first drill rod is opened and a cable having a latching device at an end thereof is lowered into the first drill rod. The winch is retracted to retrieve the first core barrel. The first core barrel is laterally displaced from the first drill rod. A second core barrel is inserted into the first drill rod and latched therein. A second drill rod is affixed to the upper end of the first drill rod. Drilling the formation is then resumed by longitudinally advancing and rotating the first and second drill rods.

Drilling using systems such as disclosed in the Williamson et al. '614 patent typically uses sea water (or the water in the body of water) as a drilling fluid to lubricate and cool the drill bit, and to lift drill cuttings out of the drill hole. There are cases in which it is desirable to add lubricant to the drilling fluid in order to increase drilling efficiency. Environmental considerations may make the use of artificial lubricants undesirable.

SUMMARY

One aspect of the invention is a method for drilling formations below the bottom of a body of water. A method according to the present aspect of the invention includes mixing hagfish slime with water from the body of water and using the mixture to drill the formations below the water bottom.

Other aspects and advantages of the invention will be apparent from the description and claims which follow.

BRIEF DESCRIPTION OF THE DRAWINGS

FIG. 1 shows an example sea floor drilling operation.

DETAILED DESCRIPTION

Hagfish are marine craniates of the class Agnatha or Myxini, also known as Hyperotreti. Some researchers regard Myxini as not belonging to the subphylum Vertebrata.—That is, they are the only living animals that have a skull but not a vertebral column. See, N. A. Campbell and J. B. Reece (2005). *Biology* Seventh Edition. Benjamin Cummings, San Francisco Calif.

Despite their name, there is some debate about whether they are strictly fish, since they belong to a much more primitive lineage than any other group that is placed in the category of fish (Chondrichthyes and Osteichthyes). The earliest fossil record dates back approximately 550 million years, or earlier to the Lower Cambrian period. Their unusual feeding habits and slime-producing capabilities have led members of the scientific community and popular media to dub the hagfish as the most "disgusting" of all sea creatures. Although hagfish are sometimes called "slime eels", they are not eels at all. See, Sea and Sky: Atlantic Hagfish.

Hagfish are long and vermiform, and can excrete copious quantities of a "slime" or mucus (from which the typical species *Myxine glutinosa* was named) of unusual composition. When captured and held, e.g., by the tail, they secrete the slime, which expands into a gelatinous and sticky "goo" when combined with water; if they remain captured, they can tie themselves in an overhand knot which works its way from the head to the tail of the animal, scraping off the slime as it goes and freeing them from their captor, as well as the slime.

Recently it has been reported that the slime entrains water in its microfilaments, creating a slow-to-dissipate viscoelastic substance, rather than a simple gel, and it has been proposed that the primary protective effect of the slime is related to impairment of the function of a predator fish's gills. See, Lim, J; Fudge, D S; Levy, N; Gosline, J M (Jan. 31, 2006). "Hagfish slime ecomechanics: testing the gill-clogging hypothesis". *Journal of Experimental Biology* 209 (Pt 4): 702-710. It has been observed that most of the known predators of hagfish are varieties of birds or mammals; it has been proposed that the lack of marine predators can be explained by a "gill-clogging hypothesis", wherein one purpose of the slime is to impair the gill function of marine animals that attempt to prey on the hagfish. If true, it could be regarded as a highly successful evolutionary strategy against predatory fish. Ibid.

Free-swimming hagfish also excrete "slime" when agitated and will later clear the mucus off by way of the same travelling-knot behavior. See, Martini, F. H. (1998). *The ecology of hagfishes*. (ed. J. M. Jorgensen, J. P. Lomholt, R. E. Weber and H. Make), pp. 57-77. London: Chapman and Hall. See also, Strahan, R. (1963), *The behavior of myxinoids*. Acta Zool. 44, 73-102. The reported gill-clogging effect suggests that the travelling-knot behavior is useful or even necessary to restore the hagfish's own gill function after "sliming".

An adult hagfish can secrete enough slime to turn a 20 liter (5 gallon) bucket of water into slime in a matter of minutes. Research is ongoing regarding the properties of the components of hagfish slime filament protein.

Drilling formations below the bottom of a body of water is described, for example, in U.S. Pat. No. 7,380,614 issued to Williamson et al. incorporated herein by reference. FIG. 1 shows a ship or vessel 2 having a winch 3 or similar spooling device thereon on the surface of a body of water 4 such as the ocean. The winch 3 can spool and unspool a deployment cable 6 and an umbilical cable 34 used to deploy a drilling system 10 on the bottom 11 of the body of water. The deployment cable 6 may nor may not be part of the same physical cable as the umbilical cable 34. A water bottom based drilling system 10 is deployed using the cable 6 and is caused to rest on the bottom 11 of the body of water. After drilling operations are completed, the system 10 may be retrieved and returned to the vessel 2. The drilling operations are more completely described in the Williamson et al. '614 patent.

In an example method according to the invention, hagfish may be caused to generate bodily slime in a container at the surface. One or more hagfish may be deployed in the container and agitated to cause secretion of the slime. The slime may be lowered in a separate container (not shown separately) along with the drilling system 10 when it is deployed on the water bottom. The slime may be mixed with sea water for use as a drilling fluid during the drilling operations. Effective mixtures may range from about one part hagfish slime to 10 parts of water to about one part hagfish slime to about 20 parts of water. Drilling operations may be performed as described in the Williamson et al. '614 patent or as otherwise known in the art of sea floor drilling using the above described hagfish slime-water mixture. It is within the scope of the invention to make synthetic hagfish slime as well as using slime obtained from live hagfish.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for drilling formations, comprising:
   mixing a selected amount of hagfish slime with water; and
   drilling the formations using the slime-water mixture as a circulating drilling fluid.

2. The method of claim 1, wherein the mixture comprises between one part slime to ten parts water and one part slime to twenty parts water.

3. The method of claim 1, wherein the drilling of formations using the slime-water mixture comprises drilling formations below the bottom of a body of water.

4. The method of claim 3, wherein the water in the mixing of the hagfish slime is from the body of water.

* * * * *